United States Patent
Frijlink et al.

(10) Patent No.: US 11,518,829 B2
(45) Date of Patent: Dec. 6, 2022

(54) PROCESS FOR MODIFYING LDPE

(71) Applicant: NOURYON CHEMICALS INTERNATIONAL B.V., Arnhem (NL)

(72) Inventors: Wilhelm Klaas Frijlink, Zwolle (NL); Jan Martijn Van Der Schuur, Hengelo (NL)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 270 days.

(21) Appl. No.: 16/765,974

(22) PCT Filed: Nov. 23, 2018

(86) PCT No.: PCT/EP2018/082319
§ 371 (c)(1),
(2) Date: May 21, 2020

(87) PCT Pub. No.: WO2019/105851
PCT Pub. Date: Jun. 6, 2019

(65) Prior Publication Data
US 2020/0362068 A1    Nov. 19, 2020

(30) Foreign Application Priority Data
Nov. 28, 2017   (EP) ..................... 17204010

(51) Int. Cl.
| | | |
|---|---|---|
| *C08F 110/02* | (2006.01) | |
| *C08J 3/24* | (2006.01) | |
| *C08J 5/18* | (2006.01) | |
| *C08K 5/14* | (2006.01) | |
| *C09D 123/26* | (2006.01) | |

(52) U.S. Cl.
CPC ............... *C08F 110/02* (2013.01); *C08J 3/24* (2013.01); *C08J 5/18* (2013.01); *C08K 5/14* (2013.01); *C09D 123/26* (2013.01); *C08F 2810/10* (2013.01); *C08F 2810/20* (2013.01); *C08J 2323/26* (2013.01)

(58) Field of Classification Search
CPC ......... C08F 8/50; C08F 10/02; C08F 2500/12
See application file for complete search history.

(56) References Cited

U.S. PATENT DOCUMENTS

| | | | | |
|---|---|---|---|---|
| 6,521,734 | B1 * | 2/2003 | Araki ................ | B32B 37/153 |
| | | | | 526/352.2 |
| 2010/0076160 | A1 * | 3/2010 | Beran ................ | C08F 8/00 |
| | | | | 525/387 |
| 2016/0194421 | A1 * | 7/2016 | Mariott ............. | C08J 5/18 |
| | | | | 526/348.5 |

FOREIGN PATENT DOCUMENTS

| | | | | |
|---|---|---|---|---|
| CN | 102863670 | A | 1/2013 | |
| CN | 104379609 | A | 2/2015 | |
| JP | 2009019112 | A | 1/2009 | |
| WO | WO-2013095862 | A1 * | 6/2013 | ............ C08F 210/02 |
| WO | 2014143507 | A1 | 9/2014 | |
| WO | WO-2016204949 | A1 * | 12/2016 | ............ B29C 48/022 |

OTHER PUBLICATIONS

EPO, Extended European Search Report issued in European Application No. 17204010.7, dated Jul. 10, 2018.
ISA-EPO, International Search Report issued in International Application No. PCT/EP2018/082319, dated Feb. 13, 2019.
Bremner, T. et al. "Effects of polyethylene molecular structure on peroxide crosslinking of low density polyethylene", Polymer Engineering and Science, Jul. 1992, pp. 939-943, vol. 32, No. 14.

* cited by examiner

*Primary Examiner* — Robert C Boyle
(74) *Attorney, Agent, or Firm* — Lorenz & Kopf, LLP

(57) ABSTRACT

Process for obtaining polyethylene with an MFI (190° C./2.16 kg) of at least 4 g/10 minutes and a melt strength (190° C.) of at least 8.0 cN, said process involving extrusion of low density polyethylene (LDPE) with an MFI of at least 5 g/10 minutes and a vinyl content of less than 0.25 terminal vinyl groups per 1000 C-atoms (measured with NMR in deuterated tetrachloroethane solution)—in the presence of 500-5,000 ppm, based on the weight of low density polyethylene, of an organic peroxide.

13 Claims, No Drawings

PROCESS FOR MODIFYING LDPE

CROSS-REFERENCE TO RELATED APPLICATION

This application is a U.S. National-Stage entry under 35 U.S.C. § 371 based on International Application No. PCT/EP2018/082319, filed Nov. 23, 2018, which was published under PCT Article 21(2) and which claims priority to European Application No. 17204010.7, filed Nov. 28, 2017, which are all hereby incorporated in their entirety by reference.

TECHNICAL FIELD

The present invention relates to a process for the modification of low density polyethylene (LDPE) by reactive extrusion.

BACKGROUND

It is known to change the morphology and, consequently, the rheological properties of polyethylene by reactive extrusion in the presence of an organic peroxide. This leads to increased levels of long chain branching and, thereby, improved melt elasticity and improved melt strength.

US 2010/0076160, for instance, discloses the reactive extrusion of so-called 'tubular LDPE' to increase the long chain branching index.

LDPE is polyethylene having a density in the range 0.910-0.940 g/cm3 and is obtained by free radical polymerization of ethylene under high pressure. This process is either performed in an autoclave or in a tubular reactor. LDPE made by the autoclave reactor process ('autoclave LDPE') has a higher branching number than LDPE made by the tubular reactor process ('tubular LDPE'). As a result, autoclave LDPE has a higher melt strength and is easier to process.

Commercial autoclave LDPE grades used for extrusion coating applications usually have an MFI (melt flow index) of at least 4 g/10 min Lower MFI negatively affects the processability of the material.

The melt strength of autoclave LDPE with MFI>4 g/10 min is generally 8.0 cN or more; whereas the melt strength of tubular LDPE with the same MFI is generally less than 8 cN. Melt strengths below 8 cN generally lead to inhomogeneous film thickness of the coating (high neck-in and poor draw-down).

Unfortunately, the autoclave process has a lower monomer conversion rate, requires higher capital investments, and has a poorer economy of scale than the tubular process. Hence, there is a desire to increase the melt elasticity and melt strength of tubular LDPE towards or even beyond that of autoclave LDPE of similar MFI.

This has been found possible by reactive extrusion in the presence of an organic peroxide.

Unfortunately, films obtained from reactively extruded LDPE tend to contain inhomogeneities, so-called gels. These are visual defects that transmit light differently from the rest of the material. Such gels consist of ultra high molecular weight polyethylene, formed by crosslinking. Gel formation leads to unacceptable aesthetic properties and to problems in printing and lamination processes; such as tearing of the film. Especially the lamination of LDPE cast film on cardboard—used to improve the barrier properties of e.g. drink packages—may suffer from film tearing at large gel-particles (typically above 600 μm).

Hence, there is a desire for a process for reactively extruding LDPE that allows for the manufacture of films with improved homogeneity, i.e. less visual defects. At the same time, the rheological properties of the resulting polyethylene should be about equal or better than that of autoclave LDPE. In addition, other objects, desirable features and characteristics will become apparent from the subsequent summary and detailed description, and the appended claims, taken in conjunction with the accompanying drawings and this background.

SUMMARY

It has now been found that gel formation can be significantly reduced by using LDPE with a low number of unsaturations, more in particular a low number of terminal vinyl groups. An even further improvement is achieved by optimizing the temperature and residence time in the extruder for the specific peroxide used.

The present invention therefore relates to a process for obtaining polyethylene with an MFI (190° C./2.16 kg) of at least 4 g/10 min and a melt strength (190° C.) of at least 8.0 cN, said process involving extrusion of low density polyethylene (LDPE) with an MFI of at least 5 g/10 min and a vinyl content of less than 0.25 terminal vinyl groups per 1000 C-atoms (measured with NMR in deuterated tetrachloroethane solution) with 500-5,000 ppm, based on the weight of polyethylene, of an organic peroxide.

DESCRIPTION

The following detailed description is merely exemplary in nature and is not intended to limit the invention or the application and uses of the invention. Furthermore, there is no intention to be bound by any theory presented in the preceding background of the invention or the following detailed description.

Low density polyethylene (LDPE) is polyethylene having a density in the range 0.910-0.940 g/cm3 and being obtained by free radical polymerization of ethylene under high pressure. In addition to ethylene, said LDPE may be obtained by using up to 10 wt %, preferably 0-7 wt %, and most preferably 0-5 wt % (based on the total amount of monomers) of co-monomers. Examples of such co-monomers include vinyl acetate, vinyl alcohol, acrylates, methacrylates, butyl acrylate, ethyl acrylate, acrylic acid, methacrylic acid, and C3-C10α-olefins, such as propylene, 1-butene, 1-hexene, and 1-octene.

The LDPE to be modified according to the process of the present invention contains less than 0.25, preferably less than 0.20, more preferably less than 0.15, even more preferably less than 0.10, and most preferably not more than 0.08 terminal vinyl groups per 1000 C-atoms, as measured with NMR in deuterated tetrachloroethane (1,1,2,2-tetrachloroethane-d2) solution.

The types of unsaturation that can be present in polyethylene are terminal vinyl groups (R—CH=CH2), vinylidene groups (RR'C=CH2), and cis- and trans-vinylene groups (RCH=CHR'). The terminal vinyl content can be determined by 1H-NMR as described in the experimental section below.

LDPE with such low vinyl content is generally not directly obtained from an ethylene polymerization process. Instead, LDPE has to be subjected to a special treatment, such as hydrogenation or hydroformylation (as described is WO 2014/143507), in order to reduce the vinyl content.

In a preferred embodiment, the LDPE is extruded at a maximum temperature T, with a residence time tr, and in the presence of an organic peroxide with half-life t½ at temperature T (measured in monochlorobenzene), wherein tr/t½< 400.

The maximum temperature during the extrusion is temperature T. If the extruder contains multiple zones with different temperatures, temperature T corresponds to the highest temperature that is applied.

Maximum temperature T preferably ranges from the melting temperature of the LDPE to be modified up to 240° C., more preferably 180-220° C., even more preferably 190-220° C., most preferably 190-200° C.

The residence time in the extruder (tr) is defined as 1.5 times the BreakThrough Time (BTT), which is determined by introducing a pigmented granule(s) in the mouth of the extruder and measuring the time required for a pigmented polymer melt to leave the extruder die. The residence time is preferably in the range 0.5-2 minutes. The ratio of the residence time and the peroxide's half-life at temperature T (tr/t½) is preferably less than 350, more preferably less than 300, even more preferably less than 250, even more preferably less than 200, even more preferably less than 150, and most preferably less than 100.

As illustrated in the Examples below, higher ratios may increase gel formation. Without being bound to theory, it is speculated that within the preferred ratio, transformation of alkyl radicals—formed after H-abstraction from LDPE by peroxide radicals—into allyl radicals is minimized Allyl radicals pose a higher risk of gel formation than alkyl radicals.

The ratio of the residence time and the peroxide's half-life at temperature T is preferably more than 1, more preferably at least 5, even more preferably at least 10, and most preferably at least 15. Lower ratios may lead to residual peroxide in the polyethylene.

The half-life of the organic peroxide is determined by differential scanning calorimetry-thermal activity monitoring (DSC-TAM) of a 0.1 M solution of the initiator in monochlorobenzene, as is well known in the art.

Preferred organic peroxides are monoperoxy carbonates and peroxy ketals with a 1 hour half-life—measured with DSC-TAM as 0.1 M solution in monochlorobenzene—of 125° C. or below.

Particularly preferred peroxides include: 1,1-di(tert-butylperoxy)-3,3,5-trimethylcyclohexane, 2,2-di(tert-butylperoxy)butane, 1,1-di(tert-butylperoxy)cyclohexane, 1,1-di(tert-amylperoxy)cyclohexane, butyl-4,4-di(tert-butylperoxy)valerate, tert-butylperoxy 2-ethylhexyl carbonate, tert-amylperoxy-2-ethylhexyl carbonate, and tert-butylperoxy isopropyl carbonate.

In a preferred embodiment, the LDPE to be modified by the process of the present invention is tubular LDPE. Tubular LDPE is polyethylene made by free radical polymerization in a high pressure tubular process. The process according to the invention can modify said tubular LDPE into an LDPE with the quality of autoclave LDPE or even better (in terms of melt strength).

Preferably, the LDPE to be modified has a density within the range of 0.915 g/cm3 to 0.935 g/cm3, more preferably 0.918 g/cm3 to 0.932 g/cm3. The density can be measured according to ISO 1183/A.

The LDPE to be modified has a melt flow index (MFI)—measured at 190° C. and with a load of 2.16 kg—of at least 5 g/10 minutes, preferably 5-100 g/10 minutes, more preferably 5-60 g/10 minutes, even more preferably 8-60 g/10 minutes, even more preferably 10-60 g/10 minutes, and most preferably 10-40 g/10 minutes.

The LDPE to be modified preferably has a weight average molecular weight (Mw) of at least 100,000 g/mole. Such molecular weights are preferred for obtaining the desired melt strength. Mw can be determined with High Temperature Size Exclusion Chromatography (HT-SEC) as described in the experimental section below.

The organic peroxide can be added to the molten LDPE in the extruder, e.g. by liquid peroxide injection or by side feeding of peroxide blended in (LD)PE using a side extruder. Alternatively, solid LDPE (e.g. pellets, powder, or chopped materials) can be impregnated with organic peroxide prior to extrusion. The peroxide may be separately added to the hopper of the extruder by spraying or dripping the liquid peroxide or liquid peroxide formulation on the polyethylene.

The organic peroxide can be introduced as such, incorporated in an (LDPE) masterbatch or on a solid inorganic carrier (e.g. silica or kaolin), or dissolved or diluted in a phlegmatizer. Suitable phlegmatizers include linear and branched hydrocarbon solvents, such as isododecane, tetradecane, tridecane, Exxsol® D80, Exxsol® D100, Exxsol® D 100S, Soltrol® 145, Soltrol® 170, Varsol® 80, Varsol® 110, Shellsol® D100, Shellsol® D70, Halpasol® i 235/265, Isopar® M, Isopar® L, Isopar® H, Spirdane® D60, and Exxsol D60.

If desired—for instance to increase the ease of dosing—the organic peroxide can be even further diluted with a solvent. Examples of suitable solvents include the phlegmatizers listed above, or other common solvents, like toluene, pentane, acetone or isopropanol.

The organic peroxide is used in an amount within the range 500-5,000 ppm, more preferably 600-4,000 ppm, even more preferably 700-3,000 ppm, and most preferably 700-2,500 ppm, based on LDPE weight and calculated as neat peroxide.

Amounts significantly higher than 5,000 ppm may result in crosslinked polyethylene instead of long chain branched polyethylene. Crosslinking (gel formation) is evidently undesired.

The reaction of the polyethylene with the organic peroxide is preferably performed under inert (e.g. nitrogen) atmosphere.

The reaction is preferably performed in the absence of additional compounds containing unsaturations, as their presence would increase gel formation.

The modified polyethylene resulting from the process of the present invention has an MFI of at least 4 g/10 minutes, preferably in the range 4-15 g/10 minutes, and a melt strength of at least 8 cN.

This modified polyethylene has many applications. It can be used in extruded films, including blown films and cast films. It can also be foamed and/or thermoformed. The modified polyethylene can also be used in molding, including blow molding.

More importantly, it can be used in extrusion coating.

EXAMPLES

Determination of the Terminal Vinyl Content 50 mg of the polyethylene sample (powder or chopped material) together with 1 ml 1,1,2,2-tetrachloroethane-d2 (TCE-d2) were transferred into a 5 mm NMR tube. The NMR tube was purged with nitrogen gas and closed. The tube was placed in an oven at 120° C. to dissolve the polyethylene. After obtaining a clear transparent solution, the NMR tube was placed in the NMR spectrometer (Bruker Avance-IIIHD NMR spectrometer with a proton resonance frequency of 400 MHz using a 5 mm BBFOplus-probe).

Spectra were recorded at 120° C. Standard single-pulse excitation was employed utilizing a 30 degree pulse, a relaxation delay of 2.5 sec and 20 Hz sample rotation. A total of 750 transients were acquired per spectra. All reported chemical shifts were internally referenced to the signal resulting from the residual protonated solvent (TCE) at 5.98 ppm. The characteristic signals and chemical structures present are listed in Table 1.

TABLE 1

| Group | Structure | 1H chemical shift region | nH |
|---|---|---|---|
| Backbone chain | —(CH$_2$)$_n$— | 0.50-2.80 | 2 |
| Vinyl | R—CH=CH$_2$ | 4.95-5.05 | 2 |
| Vinylidene | RR'C=CH$_2$ | 4.70-4.85 | 2 |
| Cis/trans vinylene | RCH=CHR' | 5.30-5.55 | 2 |

The amount of each unsaturated group (=Nunsat) was quantified using the integral (=Iunsat) of the group accounting for the number of reporting sites per functional group (=nH):

Nunsat=Iunsat/nH (Nunsat=Nvinylidene, Nvinyl or Ncis/trans)

The content of the unsaturated groups (Uunsat) was calculated as the fraction of the unsaturated group with respect to the total number of carbons present.

Uunsat=Nunsat/Ctotal

The total amount of carbon (Ctotal) was calculated from the bulk aliphatic integral between 2.80 and 0.50 ppm, accounting for the number of reporting nuclei and compensating for sites relating to unsaturation not included in this region.

Ctotal=(1/2)*(Ialiphatic+Nvinylidene+Nvinyl+Ncis/trans)

EXAMPLE 1

Polyethylenes used

Using the above described NMR technique, two commercial LDPEs were analysed for their degree of unsaturation. The results are reported in Table 2.

TABLE 2

| | Unsaturation content/1000 C. | | |
|---|---|---|---|
| Sample code | Vinylidene | Vinyl | Cis/trans-vinylene |
| LDPE-A (Sabic) MFI = 22 | 0.09 | 0.29 | 0.06 |
| LDPE-B (ExxonMobil) MFI = 19 | 0.11 | 0.05 | 0.03 |

General Process Description

Low density polyethylene (LDPE) materials that were commercially available as powder (i.e. milled pellets) were used as such. In case only pellets were commercially available, the pellets were chopped by means of a Colortronic chopper equipped with a 3-mm sieve.

The peroxides-1,1-di(tert-butylperoxy)-3,3,5-trimethyl-cyclohexane (Trigonox® 29 ex-AkzoNobel) and tert-butylperoxy-2-ethylhexyl carbonate (Trigonox® 117 ex-AkzoNobel)—were dissolved in 30 ml pentane and formulated on 1300 grams of powder or chopped LDPE. Pentane was allowed to evaporate in a fume cupboard for approx. 4 hours and the LDPE/peroxide compounds were mixed.

The compounds were extruded on a Haake PolyLab OS RheoDrive 7 system fitted with a Haake Rheomex OS PTW16 extruder (co-rotating twin-screw, L/D=40), from Thermo Scientific, using following settings:

Three temperature profiles were tested: see Table 3
Screw speed: 150 rpm
Throughput: 1.5 kg/h, dosed by a Brabender gravimetric screw feeder type DDW-MD2-DSR28-10
Nitrogen was purged at the hopper (3.5 L/min) and at the circular die (9 L/min)
Residence time: 87 sec.
A screw configuration with two kneading sections was used: in zones 2-3 and 6-7, with a left-handed (i.e. reverse) element at the end of each kneading section Table 3 presents the different temperature profiles used for the experiments on the PTW16 extruder.

TABLE 3

| T-profiles | Hopper | Zone 1 | 2 | 3 | 4 | 5 | 6 | 7 | 8 | 9 | Die 10 |
|---|---|---|---|---|---|---|---|---|---|---|---|
| 180° C. | 30 | 90 | 140 | 180 | 180 | 180 | 180 | 180 | 180 | 180 | 180 |
| 200° C. | 30 | 90 | 140 | 180 | 200 | 200 | 200 | 200 | 200 | 200 | 200 |
| 220° C. | 30 | 90 | 140 | 180 | 220 | 220 | 220 | 220 | 220 | 220 | 220 |

The extruded strand was led through a water bath for cooling and granulated by an automatic granulator. The obtained granules were dried overnight in a circulation oven at 50° C.

Cast Film Preparation and Gel-Count Measurement

Cast film was prepared by extruding the obtained granules on a Dr. Collin Teach-Line E20T single-screw extruder, fitted with a Dr. Collin Teach-Line CR144T and CCD (Charged Coupled Device) camera for cast film preparation and gel evaluation. The following settings were used:

Temperature profile: 110-140-160-170-170° C. for zones 1 to 5
Screw speed: 50 rpm
Slit die approx. 8 cm, slit width 0.5 mm, gap between slit die and roll approx. 4 cm
Rolls were cooled with water at temperature of 25° C.
Film thickness of obtained cast films: 50 μm
Gel-count evaluation in different size ranges: <300 μm, 300-450 μm, 450-600 μm and >600 μm
Gel-count area: 1 m$^2$ film Melt Flow Index The melt flow index (MFI) was measured with a Goettfert Melt Indexer MI-3 according to ISO 1133 (190° C./2.16 kg load). The MFI is expressed in g/10 min.

Melt Strength

The melt strength (MS) was measured (in cN) with a Goettfert Rheograph 20 (capillary rheometer) in combination with a Goettfert Rheotens 71.97, according to the manufacturer's instructions using the following configuration and settings:

Rheograph:
Temperature: 190° C.
Melting time: 10 minutes
Die: capillary, length 30 mm, diameter 2 mm
Barrel chamber and piston: diameter 15 mm
Piston speed: 0.32 mm/s, corresponding to a shear rate of 72 s$^{-1}$
Melt strand speed (at start): 20 mm/s Rheotens:
    Acceleration of wheels (strand): 10 mm/s$^2$
    Barrel to mid-wheel distance: 100 mm
    Strand length: 70 mm
Molecular Weight The molecular weights of the LDPE samples were determined with High Temperature Size Exclusion Chromatography (HT-SEC) at 150° C. The triple detection system was calibrated using polystyrene standard 96K (Polymer Laboratories, Mw/Mn=1.03) in 1,2,4-trichlorobenzene at 150° C.

Each sample was dissolved in 1,2,4-trichlorobenzene (containing 300 ppm BHT), by heating at 160° C. under nitrogen atmosphere, for four hours.

A Malvern Viscotek HT-GPC system equipped with RI detector, LALS and RALS Light Scattering detector, and Viscometer was used.

Columns: A PL Gel Olexis Guard Column, 50×7.5 mm, 13 µm particle size, followed by three PL Gel Olexis 300×7.5 mm columns (13 µm particle size)
Mobile phase: 1,2,4-trichlorobenzene (Sigma-Aldrich, ReagentPlus, 99%), distilled, 300 ppm BHT added and eluent filtered through 0.2 µm PTFE, filter.
Flow: 1 ml/min
Sample concentration: 3 mg/ml
Temperature: Autosampler and injector line heater at 160° C., and column/detector oven at 150° C.
Injection volume: 200
Data processing: Omnisec™ v 4.61
Dn/dc for PE: 0.105

The molecular weights of the samples, i.e. the number-average (Mn), weight-average (Mw), and z-average (Mz) molecular weights, were calculated from Light Scattering (LS) detection.

Results

Table 4 presents the results obtained for the different LDPE materials, peroxides, and temperature profiles.

In Table 5, the molecular weights of the different LDPE materials are given, and the polydispersity is calculated as $M_w/M_n$, and $M_z/M_w$. It is noted that the higher $M_z/M_w$, the more shear thinning the polymer is and the less energy input is required for obtaining the same extruder output.

The virgin LDPE's used had almost the same starting MFI (range 19-22) and mainly differed in their terminal vinyl content. Since each polyethylene application requires a specific MFI, it is important to reach similar MFIs after extrusion. In order to achieve this, different amounts of peroxide were required for each LDPE grade. LDPE with low vinyl content required higher amounts of peroxide.

TABLE 4

| | Peroxide and conc. | T-profile (° C.) | $t_r/t_{1/2}$ | Gel-count >600 µm (per 1 m$^2$) | MFI @ 190° C./ 2.16 kg (g/10 min) | Melt strength @ 190° C. (cN) |
|---|---|---|---|---|---|---|
| LDPE-B (=ExxonMobil LD600BA) - terminal vinyl content: 0.05/1000 C. | | | | | | |
| virgin | none | none | | 20 | 19.0 | |
| blank extruded | none | 180 | | 45 | 19.4 | |
| | | 200 | | 26 | 19.3 | |
| | | 220 | | 24 | 18.8 | |
| modified | 0.24% Trigonox 29 | 180 | 19 | 35 | 8.0 | 10.9-11.3 |
| | | 200 | 79 | 32 | 8.3 | 10.5-11.0 |
| | | 220 | 290 | 57 | 8.4 | 10.2-10.4 |
| modified | 0.15% Trigonox 117 | 180 | 16 | 84 | 7.7 | 12.5-14 |
| | | 200 | 90 | 41 | 8.1 | 12.0-13.0 |
| | | 220 | 435 | 188 | 8.3 | n.m.* |
| LDPE-A (=Sabic 1922z500) - Comparative (terminal vinyl content: 0.29/1000 C.) | | | | | | |
| virgin blank extruded | none none | none 220 | | 11 27 | 22.3 | |
| modified | 0.16% Trigonox 29 | 180 220 | 19 290 | 232 596 | 8.0 8.7 | 6.0-6.3 n.m. |
| Autoclave LDPE | | | | | | |
| AC LDPE (=Ineos 19N430) | | | | | 7.5 | 9.0 |

*n.m. = not measured

Table 4 shows that the reactive extrusion of a polyethylene with a low terminal vinyl content leads to melt strength values higher than that of autoclave LDPE, whereas reactive extrusion of polyethylene with high terminal vinyl content gave lower melt strength values.

The polyethylene obtained by the process of the present invention showed gel formation in cast film close to, or only a little higher, than that of the virgin material and of the same LDPE extruded without peroxide. In Table 4 this is shown for gel-particles >600 µm (which are the most critical particles for, e.g., extrusion coating), but the same effect was seen for smaller gel particles.

A higher terminal vinyl content resulted in modified LDPE with (extremely) high gel-count.

TABLE 5

| | Peroxide and conc. | T-profile (0° C.) | Mn (kg/mole) | Mw (kg/mole) | Mz (kg/mole) | Mw/Mn | Mz/Mw |
|---|---|---|---|---|---|---|---|
| LDPE-B (=ExxonMobil LD600BA) - terminal vinyl content: 0.05/1000 C. | | | | | | | |
| virgin | none | none | 11 | 118 | 426 | 11.2 | 3.6 |
| blank extruded | none | 180 | 12 | 112 | 385 | 9.3 | 3.4 |
| | | 200 | 11 | 114 | 444 | 10.4 | 3.9 |
| | | 220 | 12 | 112 | 396 | 9.3 | 3.5 |
| modified | 0.24% Trigonox 29 | 180 | 17 | 196 | 1,053 | 11.5 | 5.4 |
| | | 200 | 16 | 192 | 969 | 12.0 | 5.0 |
| | | 220 | 16 | 191 | 952 | 11.9 | 5.0 |
| modified | 0.15% Trigonox 117 | 180 | 15 | 213 | 1,216 | 14.2 | 5.7 |
| | | 200 | 12 | 199 | 1,185 | 16.6 | 6.0 |
| | | 220 | 14 | 209 | 1,136 | 14.9 | 5.4 |
| LDPE-A (=Sabic 1922z500) - Comparative (terminal vinyl content 0.29/1000 C.) | | | | | | | |
| virgin | none | none | 10 | 77 | 226 | 7.8 | 2.9 |
| modified | 0.16% Trigonox 29 | 180 | 13 | 118 | 476 | 9.1 | 4.0 |
| | | 220 | 11 | 113 | 438 | 10.3 | 3.9 |
| Autoclave LDPE | | | | | | | |
| AC LDPE (=Ineos 19N430) | | | 14 | 251 | 1,618 | 17.9 | 6.4 |

EXAMPLE 2

Example 1 was repeated, except for (i) the nature of the LDPE's that were used and (ii) the screw configuration of the extruder.

The screw configuration used in the present example had three kneading sections—at zones 2-3, 4-5 and 7-8—with no reverse elements at the end of said kneading sections, thereby giving less torque during extrusion.

The T-profiles used were 180° C. and 200° C. (see Table 3).

Using the NMR technique described in Example 1, three additional commercial LDPEs were analysed for their degree of unsaturation. Results for all LDPEs used in this example are reported in Table 6.

TABLE 6

| | Unsaturation content/1000 C. | | |
|---|---|---|---|
| Sample code | Vinylidene | Vinyl | Cis/trans-vinylene |
| LDPE-A (Sabic) MFI = 22 | 0.09 | 0.29 | 0.06 |
| LDPE-B (ExxonMobil) MFI = 19 | 0.11 | 0.05 | 0.03 |
| LDPE-C (LyondellBasell) MFI = 19 | 0.20 | 0.32 | 0.08 |
| LDPE-D (Braskem) MFI = 20 | 0.21 | 0.08 | 0.14 |
| LDPE-E (Ineos) MFI = 24 | 0.13 | 0.02 | <0.01 |

Table 7 presents the results obtained for the different LDPE materials, peroxides, and temperature profiles.

In Table 8 the molecular weights of the different LDPE materials are given, and the polydispersity is calculated as $M_w/M_n$ and $M_z/M_w$.

TABLE 7

| Peroxide and conc. | T-profile (° C.) | $t_r/t_{1/2}$ | Gel-count >600 μm (per 1 m²) | MFI @ 190° C./ 2.16 kg (g/10 min) | Melt strength @ 190° C. (cN) |
|---|---|---|---|---|---|
| LDPE-E (=Ineos 23T930) - terminal vinyl content: 0.02/1000 C. | | | | | |
| virgin | none | none | 15 | 23.8 | |
| blank extruded | none | 200 | 24 | 23.2 | |
| modified 0.15% Trigonox 117 | 200 | 90 | 56 | 8.4 | 19.0-20.5 |
| LDPE-B (=ExxonMobil LD600BA) - terminal vinyl content: 0.05/1000 C. | | | | | |
| virgin | none | none | 12 | 19.0 | |
| blank extruded | none | 180 | 131 | 19.2 | |
| | | 200 | 34 | 19.0 | |
| modified 0.24% Trigonox 29 | 180 | 19 | 40 | 7.6 | 11.5-12.0 |
| modified 0.15% Trigonox 117 | 200 | 90 | 52 | 7.8 | 11.7-12.2 |
| LDPE-D (=Braskem SPB208 Green LDPE) - terminal vinyl content: 0.08/1000 C. | | | | | |
| virgin | none | none | 4 | 20.3 | |
| blank extruded | none | 200 | 20 | 20.2 | |
| modified 0.13% Trigonox 117 | 200 | 90 | 71 | 8.2 | 15.5-16.5 |
| LDPE-A (=Sabic 1922z500) - Comparative (terminal vinyl content: 0.29/1000 C.) | | | | | |
| virgin | none | none | 11 | | |
| blank extruded | none | 180 | 50 | 22.9 | |
| | | 200 | 48 | 22.8 | |
| modified 0.16% Trigonox 29 | 180 | 19 | 236 | 7.2 | 6.5-6.7 |
| modified 0.135% Trigonox 117 | 200 | 90 | 316 | 8.1 | 6.3-06.6 |

TABLE 7-continued

| Peroxide and conc. | T-profile (° C.) | $t_r/t_{1/2}$ | Gel-count >600 μm (per 1 m²) | MFI @ 190° C./ 2.16 kg (g/10 min) | Melt strength @ 190° C. (cN) |
|---|---|---|---|---|---|
| LDPE-C (=LyondellBasell Lupolen 1800S) - Comparative (terminal vinyl content: 0.32/1000 C.) | | | | | |
| virgin | none | none | | 14 | 18.8 |
| blank extruded | none | 200 | | 57 | 18.3 |
| modified 0.105% Trigonox 117 | 200 | 90 | 289 | 8.2 | 5.9-6.1 |
| Autoclave LDPE | | | | | |
| AC LDPE (=Ineos 19N430) | | | | 7.5 | 9.0 |

Table 7 shows that the reactive extrusion of LDPE with a low terminal vinyl content leads to melt strength values higher than that of autoclave LDPE, whereas reactive extrusion of LDPE with high terminal vinyl content gave lower melt strength values.

The gel content of LDPE having a low terminal vinyl content and modified according to the present invention was only a little higher than that of the same LDPE extruded without peroxide ('blank extruded'). In Table 7, this is shown for gel-particles >600 μm (which are the most critical particles for, e.g., extrusion coating), but the same effect was seen for smaller gel particles.

For LDPE with high terminal vinyl content, the effect of peroxide modification on the gel-count was much larger, resulting in a modified LDPE with a very high gel-count.

LDPE-B extruded without peroxide at 180° C. had a higher gel-count than LDPE-B extruded at 200° C. This might be due to its higher melt viscosity at 180° C., resulting in higher shear and more LDPE deterioration than at higher temperature.

Surprisingly, extruding LDPE-B with peroxide at 180° C. gave significantly lower gel-count than extrusion at the same temperature without peroxide. A similar effect for LDPE-B was observed in Example 1 (see Table 4).

TABLE 8

| Peroxide and conc. | T-profile (° C.) | Mn (kg/mole) | Mw (kg/mole) | Mz (kg/mole) | Mw/Mn | Mz/Mw |
|---|---|---|---|---|---|---|
| LDPE-E (=Ineos 23T930) - terminal vinyl content: 0.02/1000 C. | | | | | | |
| virgin | none | 10 | 156 | 861 | 15.4 | 5.5 |
| modified 0.15% Trigonox 117 | 200 | 11 | 335 | 2,507 | 30.5 | 7.5 |
| LDPE-B (=ExxonMobil LD600BA) - terminal vinyl content: 0.05/1000 C. | | | | | | |
| virgin | none | 11 | 118 | 426 | 11.2 | 3.6 |
| blank extruded | 200 | 11 | 108 | 396 | 9.8 | 3.7 |
| modified 0.24% Trigonox 29 | 180 | 14 | 194 | 1,078 | 13.9 | 5.6 |
| modified 0.15% Trigonox 117 | 200 | 14 | 201 | 1,099 | 14.4 | 5.5 |

TABLE 8-continued

| Peroxide and conc. | T-profile (° C.) | Mn (kg/mole) | Mw (kg/mole) | Mz (kg/mole) | Mw/Mn | Mz/Mw |
|---|---|---|---|---|---|---|
| LDPE-D (=Braskem SPB208 Green LDPE) - terminal vinyl content: 0.08/1000 C. | | | | | | |
| virgin none | none | 10 | 151 | 1,095 | 15.2 | 7.3 |
| modified 0.13% Trigonox 117 | 200 | 10 | 241 | 1,987 | 24.1 | 8.2 |
| LDPE-A (=Sabic 1922z500) - Comparative (terminal vinyl content 0.29/1000 C.) | | | | | | |
| virgin none | none | 10 | 77 | 226 | 7.8 | 2.9 |
| modified 0.16% Trigonox 29 | 180 | 11 | 125 | 632 | 11.4 | 5.1 |
| modified 0.135% Trigonox 117 | 200 | 11 | 130 | 679 | 11.8 | 5.2 |
| LDPE-C (=LyondellBasell Lupolen 1800S) - Comparative (terminal vinyl content: 0.32/1000 C.) | | | | | | |
| virgin none | none | 10 | 98 | 599 | 9.7 | 6.1 |
| modified 0.105% Trigonox 117 | 200 | 12 | 134 | 729 | 11.2 | 5.4 |
| Autoclave LDPE | | | | | | |
| AC LDPE (=Ineos 19N430) | | 14 | 251 | 1,618 | 17.9 | 6.4 |

LDPE-E and LDPE-C had the same $M_n$, but $M_w$ and $M_z$ of LDPE-E was significantly higher than of LDPE-C. LDPE-E required much more peroxide (0.15% vs. 0.105% Trigonox® 117) to reach MFI 8. Nevertheless, it showed a much lower gel-count, which must be due to its lower terminal vinyl content.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. A process for obtaining polyethylene with an MFI (190° C./2.16 kg) of at least 4 g/10 minutes and a melt strength (190° C.) of at least 8.0 cN, the process comprising: extruding low density polyethylene (LDPE) with an MFI of at least 5 g/10 minutes and a vinyl content of less than 0.25 terminal vinyl groups per 1000 C-atoms (measured with NMR in deuterated tetrachloroethane solution) in the presence of 500-5,000 ppm, based on the weight of low density polyethylene, of an organic peroxide wherein the LDPE is tubular LDPE.

2. The process according to claim 1, wherein the tubular LDPE is extruded at a maximum temperature T, with a residence time in the extruder $t_r$, and in the presence of an organic peroxide with half-life $t_{1/2}$ at temperature T (measured with DSC-TAM as 0.1 M solution in monochlorobenzene), wherein $t_r/t_{1/2}<400$.

3. The process according to claim 2, wherein $t_r/t_{1/2}<100$ and $t_r/t_{1/2}>10$.

4. The process according to claim 1, wherein temperature T ranges from the melting temperature of the tubular LDPE up to 240° C.

5. The process according to claim 4, wherein the temperature T is 180 to 200° C.

6. The process according to claim 1, wherein the organic peroxide is selected from monoperoxy carbonates and peroxy ketals with a 1 hour half-life—measured with DSC-TAM as 0.1 M solution in monochlorobenzene—of not higher than 125° C.

7. The process according to claim 6, wherein the organic peroxide comprises 1,1-di(tert-butylperoxy)-3,3,5-trimethylcyclohexane, 2,2-di(tert-butylperoxy)butane, 1,1-di(tert-butylperoxy)cyclohexane, 1,1-di(tert-amylperoxy)cyclohexane, butyl-4,4-di(tert-butylperoxy)valerate, tert-butylperoxy 2-ethylhexyl carbonate, tert-amylperoxy-2-ethylhexyl carbonate, or tert-butylperoxy isopropyl carbonate.

8. The process according to claim 1, wherein the tubular LDPE is extruded in the presence of 700-2,500 ppm, based on the weight of the tubular LDPE, of the organic peroxide (calculated as neat peroxide).

9. The process according to claim 1, wherein the process is performed in a twin-screw extruder.

10. The process according to claim 1, wherein the tubular LDPE to be extruded has an MFI in the range 5-100/10 minutes.

11. The process according to claim 10, wherein the tubular LDPE to be extruded has an MFI in the range 10-40 g/10 minutes.

12. The process according to claim 1, comprising injecting the organic peroxide into a melt of the tubular LDPE.

13. The process according claim 1, comprising adding the organic peroxide to solid LDPE prior to extrusion.

* * * * *